(No Model.)
W. ULRICH.
FIRE ESCAPE.
No. 275,962. Patented Apr. 17, 1883.
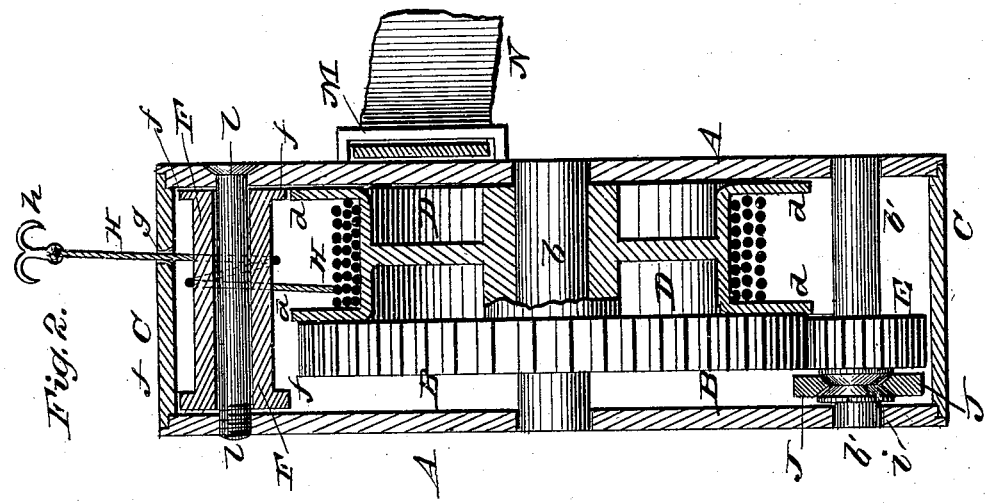
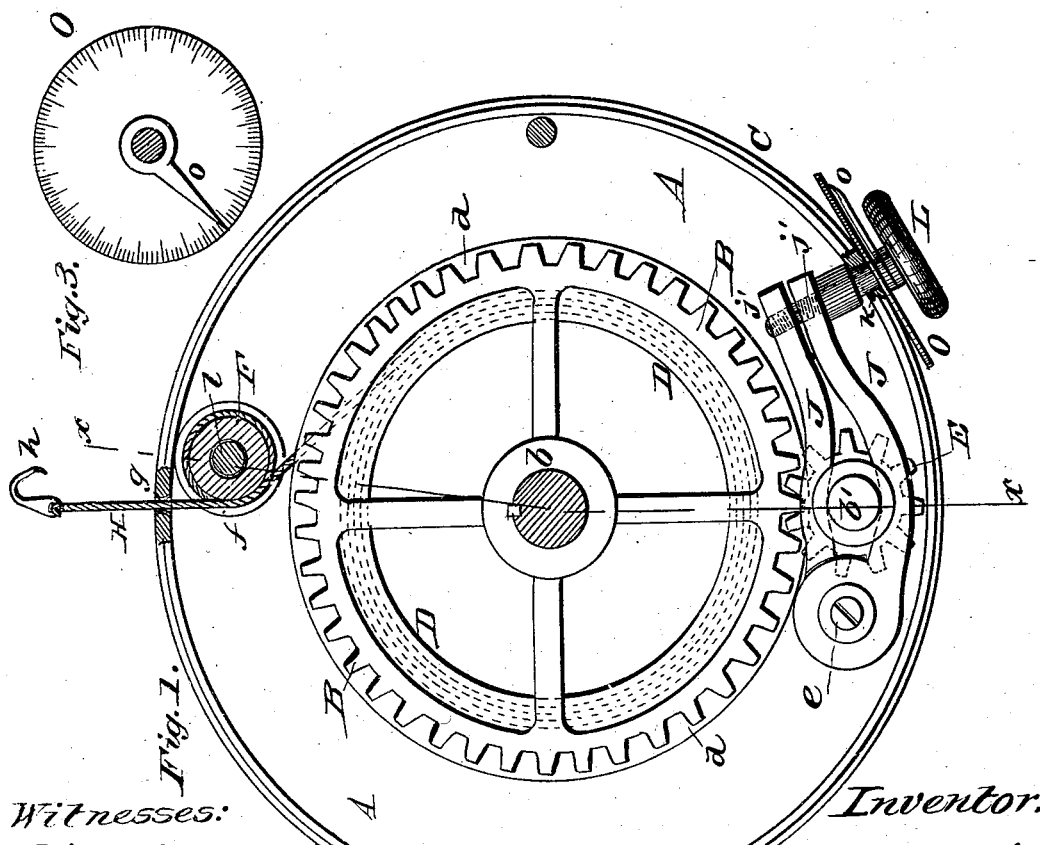
Witnesses:
Phil C. Dietrich
W. R. Keyworth
Inventor:
Wm Ulrich
by
Manahan & Ward
Attorneys.

UNITED STATES PATENT OFFICE.

WILLIAM ULRICH, OF ROCK FALLS, ILLINOIS.

FIRE-ESCAPE.

SPECIFICATION forming part of Letters Patent No. 275,962, dated April 17, 1883.

Application filed January 2, 1883. (No model.)

*To all whom it may concern:*

Be it known that I, WILLIAM ULRICH, a citizen of the United States, residing at Rock Falls, in the county of Whiteside and State of Illinois, have invented certain new and useful Improvements in Fire-Escapes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to that class of fire-escapes which are portable and light, and in its operation moves with the operator on a chain, cable, or other suitable device.

In the drawings, Figure 1 is a plan view of my invention, with one of the side plates removed. Fig. 2 is a sectional view of a vertical elevation of my invention through the line $x\,x$ of Fig. 1. Fig. 3 is a detail view.

A A are two plates, of any desired material and thickness, and may be round or square, provided at their center with a round hole, in which the axle $b$ of the wheel D is journaled, and between which all the mechanism hereinafter described is placed, and boxed in by the iron rim or plate C.

B is a cog-wheel, keyed to the axle $b$, at one end thereof and connected therewith, extending nearly to the opposite end of the axle $b$, and also keyed to said axle $b$ is the drum D, having at each of its outer edges the flanges $d\,d$.

Between the cog-wheel B and the rim C is a pinion, E, on an axle, $b'$, journaled into the sides A A, as is the axle $b$, and which meshes into the wheel B.

At a point almost directly opposite the pinion E, and between the wheel B and rim C, I place the roller F, which revolves on a bolt, $l$, passing through the sides A and such roller. This roller is provided at or near its ends with the flanges $f\,f$.

Around the drum D is coiled the carrying chain or rope H, which passes also once around the roller F and through the hole $g$ in the rim C, and to one end of which rope H is affixed the hook $h$.

Between the pinion E and the plate A nearest thereto I cut into the axle $b'$ a V-shaped incision or groove, $i$, extending clear around such axle. Near one side of the axle $b'$, and attached to the plate A by means of a rivet, $e$, are a pair of jaws, J J, operating loosely on the rivet $e$, and passing around and clamping the axle $b'$ in the V-shaped groove $i$ therein, the inner surface of such jaws J J being shaped to conform to the groove $i$. The ends of the jaws J J opposite to their point of attachment to the plate A are extended an inch or more, and are furnished at or near their loose ends with the holes $j'\,j'$, such hole in the inner jaw J being threaded with a right-hand thread, and the hole in the outer jaw J being threaded with a left-hand thread.

In the rim C, and in a line with the holes $j'\,j'$, is a hole, $k$, in which is seated the thumb-screw L, which passes through the holes $j'\,j'$, and by means of which the tension-jaws J J are forced into or released from the groove in the axle $b'$, thereby acting as a friction-brake on such axle, said thumb-screw being provided with a right and left hand thread to conform to the like threads in the holes $j'\,j'$.

On the rim C, immediately under the head of the thumb-screw L, I provide a graduated circle, O, a cipher on which represents a weight of twenty-five pounds, which I find is the weight necessary to overcome the friction of the rope H on the drum D and roller F, and from such cipher said circle O is graduated up to three hundred or more at intervals representing five pounds each. Attached to the shank of the thumb-screw, on the outside of the rim C, is the indicator $o$, which, when all tension is thrown off from the axle $b'$, rests over the cipher on the graduated circle. The object of this graduated circle and indicator is obvious. The person using my invention, knowing approximately his own weight, can, by the use of such scale and indicator, set the jaws J J into the V-shaped groove in the axle $b'$ to such a degree of tension as that he may descend at any desired rate of speed or check his descent at any desired point.

On one of the plates, A, is fastened in any suitable manner the iron loop M, through which is passed the strap N, by means of which the whole device may be buckled around the waist of the person desiring to use it. When so fastened to the person the hook $h$ is attached to a window-sill or any other fixture capable of supporting the weight of a person, the thumb-screw L is tightened so as to produce such an amount of friction as will be readily overcome by the weight of the person operating my device, and such operator can descend in safety, when the hook may be loosened and the rope recoiled around the drum D by means of a crank applied to the squared end of the axle $b$, and my invention is again ready for use.

What I claim as my invention, and desire to secure by Letters Patent of the United States, is—

1. In a fire-escape and combined with plates A A and rim C, the jaws J J and axle $b'$, having V-shaped grooves, whereby the velocity of the axle can be regulated, substantially as and for the purposes set forth.

2. The wheel B, drum D, axle $b$, sides A, pinion E, axle $b'$, jaws J, thumb-screw L, and roller F, in combination, whereby the uncoiling of the cord H is regulated at the will of the operator.

3. The axle $b'$, having V-shaped grooves, plates A A, pinion E, rim C, jaws J J, thumb-screw L, graduated circle O, and indicator $o$, all arranged substantially as and for the purpose set forth.

In testimony whereof I affix my signature in presence of two witnesses.

WILLIAM ULRICH.

Witnesses:
 GEO. B. QUIGLEY,
 V. S. FERGUSON.